United States Patent [19]

Jachec et al.

[11] Patent Number: 4,842,947

[45] Date of Patent: * Jun. 27, 1989

[54] ADHESIVE BLENDS AND COMPOSITE STRUCTURES

[75] Inventors: Kevin V. Jachec, Arlington Heights; Peter D. Becker, Roselle, both of Ill.

[73] Assignee: Quantum Chemical Corporation, Cincinnati, Ohio

[*] Notice: The portion of the term of this patent subsequent to Sep. 27, 2005 has been disclaimed.

[21] Appl. No.: 149,832

[22] Filed: Jan. 29, 1988

Related U.S. Application Data

[63] Continuation-in-part of Ser. No. 133,191, Dec. 15, 1987, Pat. No. 4,774,144, which is a continuation of Ser. No. 890,936, Jul. 28, 1986, abandoned.

[51] Int. Cl.$^4$ .................. C08L 51/06; B32B 15/08; B32B 27/08; B32B 27/28
[52] U.S. Cl. .................................... 428/461; 428/516; 428/475.8; 428/476.1; 525/71; 525/74; 525/78
[58] Field of Search .................. 525/74, 78, 207, 221; 428/516, 461, 475.8

[56] References Cited

U.S. PATENT DOCUMENTS

| | | | |
|---|---|---|---|
| 3,483,276 | 12/1969 | Mahlman | 260/897 |
| 3,671,356 | 6/1972 | Keinanen | 156/309 |
| 3,697,465 | 10/1972 | Joyner et al. | 260/27 |
| 3,746,676 | 7/1973 | Joyner et al. | 260/27 |
| 3,804,926 | 4/1974 | Schwarz et al. | 260/897 A |
| 3,849,516 | 11/1974 | Plank | 260/876 R |
| 3,856,889 | 12/1974 | McConnell | 260/897 |
| 3,987,122 | 10/1976 | Bartz et al. | 260/836 |
| 4,058,647 | 11/1977 | Inoue et al. | 428/34 |
| 4,076,670 | 2/1978 | Godfrey | 260/27 R |
| 4,198,327 | 4/1980 | Matsumoto et al. | 260/4 |
| 4,310,578 | 1/1982 | Katsura et al. | 428/516 |
| 4,409,364 | 10/1983 | Schmukler et al. | 525/74 |
| 4,472,555 | 9/1984 | Schmukler et al. | 525/74 |
| 4,510,286 | 4/1985 | Liu | 525/71 |

FOREIGN PATENT DOCUMENTS

110505 6/1984 European Pat. Off. .............. 525/74

Primary Examiner—Carman J. Seccuro
Attorney, Agent, or Firm—Marshall, O'Toole, Gerstein, Murray & Bicknell

[57] ABSTRACT

Adhesive blends especially suitable for adhesion to polypropylene and gas barrier materials are disclosed, as are composite structures incorporating such blends, and methods of making such composite structures. The blends are preferably elastomer free, and comprise a mixture of an adhesion-promoting amount of an ethylene homopolymer about 0.1 to 30 wt. % of a non-elastomeric graft copolymer of polypropylene and a graft monomer comprising a polymerizable, ethylenically unsaturated carboxylic acid or derivative, and the balance a substantially non-elastomeric ethylene/propylene copolymer wherein ethylene comprises at least 5 wt. % of the copolymer.

59 Claims, No Drawings

ADHESIVE BLENDS AND COMPOSITE STRUCTURES

CROSS-REFERENCE TO RELATED APPLICATIONS

This is a continuation-in-part of application Ser. No. 133,191 filed Dec. 15, 1987 now U.S. Pat. No. 4,774,144 issued Sept. 27, 1988, which is a continuation of application Ser. No. 890,936 filed July 28, 1986, now abandoned.

BACKGROUND OF THE INVENTION

1. Field of the Invention

This invention relates generally to adhesive blends and composite structures and, more particularly, this invention relates to an adhesive blend especially suitable for adhering to propylene polymers and gas barrier materials, and to composite structures incorporating such materials and adhesives.

2. Description of Related Art

The use of propylene polymers together with a gas barrier material, such as an oxygen barrier material, for example, in semi-rigid structures is gaining widespread acceptance in such markets as the food packaging industry. In such applications, propylene polymers provide structural integrity, and the barrier material reduces the rate and extent of transmission of molecules such as oxygen through the structure. However, propylene polymers will not bond to gas barrier materials without an intervening adhesive. Heretofore, adhesives designed to bond polypropylene to such barrier layers have exhibited a number of disadvantages.

The use of maleic anhydride modified polypropylene in adhesive applications is well known. Blends of modified and unmodified polypropylene and their use as metal coatings are disclosed, for example, in U.S. Pat. No. 3,483,276 assigned to Hercules. Adhesives which can bond polypropylene to a barrier material (such as ethylene vinyl alcohol copolymer, for example) are described in U.S. Pat. No. 4,058,647 assigned to Mitsubishi Petrochemical and in U.S. Pat. No. 4,198,327 assigned to Mitsui Petrochemical. The adhesives of U.S. Pat. Nos. 4,058,647 and 4,198,327 are blend of polypropylene modified with maleic anhydride, a propylene polymer, and a hydrocarbon elastomer or rubber.

However, the use of an elastomer in such an adhesive blend adds to the cost of the blend, and many cause material handling problems. Also, the presence of elastomers in such blends may result in undesirably high contents of extractable materials, which may render the blends unsuitable for use in food packaging applications.

Schmukler et al U.S. Pat. Nos. 4,472,555 and 4,409,364 disclose adhesive blends which provide adhesion to both polypropylene and polar substrates. These blends are mixtures of modified polyethylene, polyethylene and polypropylene.

Liu U.S. Pat. No. 4,510,286 assigned to Hercules discloses a bonding resin composition which comprises maleic anhydride modified polypropylene, a sequentially polymerized propylene/ethylene copolymer having an ethylene content of 15–30 wt. % and a propylene polymer or propylene/ethylene copolymer having an ethylene content of 0–14 wt. %.

Adhesive blends made according to the Schmukler et al or Liu patents may not provide adequate adhesion to polar substrates (such as some gas barrier materials) for some applications.

SUMMARY OF THE INVENTION

It is an object of the invention to overcome one or more of the problems described above.

According to the invention, an adhesive blend which can bond polypropylene to a gas barrier material is provided. The invention also comprehends composite structures comprising layers of polypropylene and a gas barrier material adhered together by the adhesive blend, and methods of making such composite structures.

The adhesive blend, which may be substantially elastomer-free, comprises a mixture of (a) a substantially non-elastomeric copolymer of propylene and ethylene wherein ethylene comprises at least about 5 wt. % of the copolymer, (b) up to about 30 wt. % of the blend of a non-elastomeric graft copolymer of a polypropylene and at least one polymerizable, ethylenically unsaturated carboxylic acid or acid derivative grafted onto the backbone, and (c) an adhesion-promoting effective amount of an ethylene homopolymer having a specific gravity in the range of about 0.915–0.930, inclusive, and a melt index of no more than about 4 dg/min as measured at 190° C.

Other objects and advantages of the invention will be apparent to those skilled in the art from the following detailed description taken in conjunction with the appended claims.

DETAILED DESCRIPTION OF THE INVENTION

The adhesive blend of the invention provides excellent adhesion between a polypropylene substrate and a polar or other gas barrier material even without the use of elastomeric materials in the blend. Elimination of the elastomer is advantageous both in economic and material handling considerations.

Additionally, the elimination of elastomers is especially advantageous in food packaging materials, since elimination of elastomers results in the elimination or substantial reduction in the amount of extractable materials in the adhesive. This is highly desirable in materials which must be approved by government agencies for use in food packaging.

The adhesive blend of the invention provides adhesion which is at least as good as elastomeric material-containing blends, and which may be superior thereto under some conditions. It is to be understood, however, that small amounts of an elastomeric material may be added to the blend if desired without departing from the spirit of the invention. In some cases, addition of small amounts of an elastomer may enhance adhesion, and improve impact strength and/or flexibility.

The adhesion to polar and other gas barrier materials and to polypropylene is also superior to those exhibited by prior adhesive blends.

The presence of the ethylene homopolymer significantly improves the adhesion of the inventive blend to polar or other gas barrier substrates while eliminating the need for the presence of elastomers.

The propylene/ethylene copolymer, which may comprise the bulk of the inventive blend, comprises at least about 5 wt. % ethylene. If desired, the polymer may be a terpolymer of propylene, ethylene and a third 1-olefin. The copolymer may be a random, block or impact copolymer, as desired.

It is well recognized by the art that high ethylene contents (e.g. 35–40 wt. %) in propylene/ethylene copolymers may render the copolymer elastomeric.

As used herein, the term "substantially non-elastomeric copolymer of propylene and ethylene" is understood to encompass those impact copolymers which may have somewhat rubbery microphases wherein the ethylene content of the copolymer is higher than the ethylene content of the copolymer as a whole, as long as the copolymer as a whole is not elastomeric.

The grafted ("modified") polypropylene component of the blend, which generally comprises between about 0.1 and 30 wt. % of the blend, preferably 5 to 25 wt. % and most preferably 10 to 15 wt. %, may be any of those which are well known in the art, and is a graft copolymer having a polypropylene backbone.

The grafting monomer is generally described as at least one polymerizable, ethylenically unsaturated carboxylic acid or acid derivative, such as an acid anhydride, an acid ester, an acid salt, amide, imide, or the like. Such comonomers include, but are not necessarily limited to the following: acrylic acid, methacrylic acid, maleic acid, fumaric acid, itaconic acid, citraconic acid, mesaconic acid, maleic anhydride, 4-methyl cyclohex-4-ene-1,2-dicarboxylic acid anhydride, bicyclo(2.2.2-.)oct-5-ene-2,3-dicarboxylic acid anhydride, 1,2,3,4,5,8,9,10-octahydronaphthalene-2,3-dicarboxylic acid anhydride, 2-oxa-1,3-diketospiro(4.4)non-7-ene, bicyclo(2.2.1)hept-5-ene-2,3-dicarboxylic acid anhydride, maleopimaric acid, tetrahydrophthhalic anhydride, norborn-5-ene-2,3-dicarboxylic acid anhydride, Nadic anhydride, methyl Nadic anhydride, Himic anhydride, methyl Himic anhydride, and x-methylbicyclo(2.2.1)hept-5-ene-2,3-dicarboxylic acid anhydride.

The polypropylene backbone may be a homopolymer or propylene/ethylene copolymer, but non-elastomeric, crystalline propylene homopolymers are preferred.

The grafted polypropylene may be prepared in solution, in a fluidized bed reactor, or by melt grafting, as desired. A particularly preferred grafting monomer is maleic anhydride, and a maleic anhydride/crystalline polypropylene backbone graft copolymer having a maleic anhydride content of about 0.1–3 wt. % is very suitable for use in the invention.

Those skilled in the art will recognize that relatively higher proportions of the modified polypropylene may be required as the level of comonomer therein decreases in order to maintain a desired effective level of comonomer in the blend.

The ethylene homopolymer is preferably made by a high pressure process, has a specific gravity in the range of about 0.915 to 0.930, with a melt index of about 4 dg/min or less, preferably 2 dg/min or less, and most preferably less than 1 (e.g. within the range of 0.2–0.6), as measured at 190° C. according to ASTM Method D-1238.

The ethylene homopolymer in some cases may be characterized as having a relatively narrow molecular weight distribution as measured by the ratio of weight average molecular weight ($M_w$) to number average molecular weight ($M_n$) of about 3 to 5, inclusive, although such a narrow molecular weight distribution may not be necessary in all cases. For example, one useful ethylene homopolymer is characterized with a $M_w/M_n$ ratio of 6.6. Conventional low density polyethylene (LDPE) typically has a broader molecular weight distribution, as measured by a ratio of about 10 to 15.

Two suitable polyethylene materials are sold by USI Chemicals Co. of Rolling Meadows, Ill. under the trade designations NPE 3503 and NPE 3509, respectively. Each material has a melt index of 0.3 (as measured at 190° C.), a $M_n$ of about 30,000, and a ratio $M_w/M_n$ of about 3.1 or 3.3. The specific gravity of both materials is 0.925.

Other useful HMW LDPE materials are USI Chemicals Co. Product NPE 3505 and those sold by Neste Oy of Finland.

In contrast, one conventional low density polyethylene (USI Chemicals Co. NPE 940) has an $M_n$ value of about 12,000, with a ratio of $M_w/M_n$ of about 13, and a melt index of 0.25.

The adhesive blend contains an adhesion-promoting effective amount of the ethylene homopolymer, generally comprising at least about 2 wt. % and no more than about 30 wt. % of the blend. In some applications the ethylene homopolymer should comprise at least 5 or 10 wt. % of the blend in order to provide the desired level of adhesion. The minimum effective proportion of ethylene homopolymer will be readily ascertainable by those skilled in the art.

The adhesive blend will generally comprise between about 5 and 25 wt. % of the modified polypropylene and between about 10 and 30 wt. % of the ethylene homopolymer, with the balance comprising the propylene/ethylene copolymer and any desired additives, such as stabilizers. Concentration ranges of about 5 to 15 wt. % of the modified polypropylene and about 20 to 25 wt. % of the ethylene homopolymer, with the balance propylene/ethylene copolymer, are highly preferred.

The adhesive resin is preferably prepared by melt compounding the three components together with the usual additives and pelletizing the blended material. The blended material is useful in bonding propylene polymers to gas barrier materials or other polar substrates such as metals, nylon, ethylene vinyl alcohol copolymers and the like.

As used herein with respect to blend components and composite structure substrates, the terms "polypropylene" and "propylene polymer" may be used interchangeably, and denote propylene homopolymers and copolymers, whether random, block or impact copolymers, unless otherwise indicated.

The invention also comprehends a method of making composite structures wherein the inventive adhesive blend is adhered to one or more solid substrates selected from propylene polymers and gas barrier materials, such as those identified herein. Suitable methods include, but are not limited to, coextrusion (e.g. blown film coextrusion), extrusion lamination, and coextrusion blow molding. The latter is a preferred method of forming bottles, for example.

EXAMPLES

The following non-limiting examples illustrate the practice of the invention.

In each example, adhesives were prepared by blending as described above. After blending, the adhesive was tested by forming a two layer cast film using a ¾ inch Wayne extruder for the adhesive and a 1 inch Killion extruder for gas barrier material and polypropylene layers. The adhesion between the layers was measured using a Chatillon tensile tester by pulling apart the layers of a 1 inch wide strip of film. The film thickness in all the examples is 7 to 8 mils total thickness with a 50:50 layer distribution.

EXAMPLE 1

The results of Experiments 1 to 5 show the effect of the ethylene homopolymer on adhesion. The compositions of these blends and the adhesions to ethylene vinyl alcohol (EVOH) copolymer are listed in Table 1, below.

Experiment 1 is a comparative experiment which shows that a blend of propylene copolymer, modified polypropylene, and 40% ethylene/60% propylene copolymer (EPM rubber) gives good adhesion to the EVOH. Replacement of the ethylene propylene copolymer with 2 melt index (MI) linear low density polyethylene (Experiment 2), a 3 HLMI (high load melt index) linear low density polyethylene (Experiment 3), or a poly(butene-1) (Experiment 4) all give poorer adhesion in the adhesive blends. However, use of a 0.3 MI low density polyethylene in Experiment 5, gives adhesion as good as found in Experiment 1 with the EPM.

TABLE 1

| | Comparison of Blend "Third Component" | |
|---|---|---|
| Experiment | Third Component | Adhesion to EVOH (lb./in.) |
| #1 | Vistalon 404 (Exxon) (EPM Rubber) | 3.3 |
| #2 | LL1002.09 (Exxon) (LLDPE - 2 MI) | 0.4 |
| #3 | K1124 (USI Chemicals) (LLDPE - 3HLMI) | 1.2 |
| #4 | Shell 8340 [Poly(butene-1)] | 1.0 |
| #5 | NPE3509 (invention) | 3.3 |

All blends contain 70 wt. % of Cosden 7350, 10 wt. % of maleic anhydride-modified polypropylene, and 20 wt. % of the "third component". The blends each contain the usual stabilizers as are well known in the art. Cosden 7350 is a random ethylene/propylene copolymer having about 6 to 8 wt. % ethylene in the copolymer chain. (USI Chemicals Co. products NPP 8602 and NPP 8752 are impact copolymers which are useful alternatives to the Cosden 7350 random copolymer). The grafted polypropylene has a crystalline polypropylene homopolymer backbone, and a maleic anhydride content of about 1 to 3 wt. %.

EXAMPLE 2

Experiments 6 through 12 illustrate the range of base propylene polymers which can be used in the adhesive blends. In Experiment 6 a propylene homopolymer (NPP 1006) was used in the blend with resulting poor adhesion. A low 5 ethylene content random copolymer, NPP 3303, also gave poor adhesion as shown in Experiment 7. The adhesion improved with the use of NPP 3333 (a random terpolymer) or Hercules 7623 (an impact copolymer) in Experiments 8 and 9. Cosden 7350 used in Experiment 10 results in good adhesion. The best adhesion was found when using impact copolymers (NPP 8602 and NPP 8752) as the base resin as shown in Experiments 11 and 12. The blends of Experiments 11 and 12 are also shown to be superior to that of Experiment 16 (Table 3, below) which is identical to that of Experiments 11 and 12 but for the identity of the propylene polymer.

TABLE 2

| | Resins for the Adhesive Matrix | | |
|---|---|---|---|
| Experiment | Matrix Resin | Wt. % | Adhesion to EVOH (lb./in.) |
| #6 | NPP 1006 (USI) | 70 | 0.1 |
| #7 | NPP 3303 (USI) | 70 | 0.2 |
| #8 | NPP 3333 (USI) | 70 | 1.0 |
| #9 | Hercules 7623 | 70 | 1.1 |
| #10 | Cosden 7350 | 70 | 3.2 |
| #11 | NPP 8602 (USI) | 65 | CNS |
| #12 | NPP 8752 (USI) | 65 | CNS |

CNS — could not separate

All blends contain 10 wt. % grafted polypropylene (as in Example 1) and the balance is NPE 3509 ethylene homopolymer. The blends also contain the usual stabilizers.

EXAMPLE 3

Experiments 13 through 16 show the concentration of the ethylene homopolymer necessary to promote good adhesion in the three-component blends of the invention. The experiments range from 10 wt. % in Experiment 13 to 25 wt. % in Experiment 16. The results are shown in Table 3. The adhesion of the blends increases as the concentration of the ethylene homopolymer increases. However, addition of too much ethylene homopolymer results in poorer physical properties for the blend.

TABLE 3

| | Ethylene Homopolymer Concentration in Blend | |
|---|---|---|
| Experiment | Wt. % NPE 3509 (USI) | Adhesion to EVOH (lb./in.) |
| #13 | 10 | 1.4 |
| #14 | 15 | 1.9 |
| #15 | 20 | 3.2 |
| #16 | 25 | 3.7 |

These adhesive blends contain 10 wt. % of modified polypropylene (as in Example 1) and, the balance is Cosden 7350 and the usual stabilizers.

EXAMPLE 4

The experiments in Table 4 show a portion of the concentration range of grafted polypropylene which may be used in the adhesive blends of the invention. Experiments 17 through 20 show that the adhesion to EVOH increases with 5 additional grafted polypropylene to a maximum and then starts to decrease. The optimum range appears to be 10 to 15 wt. % of the modified polypropylene in the blend.

TABLE 4

| | Effect of Modified Polypropylene Concentration | |
|---|---|---|
| Experiment | Wt. % Modified PP | Adhesion to EVOH (lb./in.) |
| #17 | 8 | 2.1 |
| #18 | 15 | 3.6 |
| #19 | 20 | 2.1 |
| #20 | 25 | 1.3 |

The adhesive blend of each Experiment 17–20 contains 25 wt. % of ethylene homopolymer, the grafted polypropylene of Example 1, and the balance Cosden 7350. The usual stabilizers are added.

These examples also show a method for making a multilayer structure using the adhesive of the invention and novel multilayer structures containing the adhesive bonded to a polar substrate.

EXAMPLE 5

The experiments in Table 5 compare the results using different ethylene homopolymers as the third component in the blend. It should be noted that all homopolymers having a melt index of less than 2.0 g/10 min. provided excellent adhesion. The homopolymer having a melt index of 13 provided poor adhesion.

TABLE 5
Effect of Characteristics of Ethylene Homopolymer

| Experiment | Polyethylene Specific Gravity | Melt Index (g/10 min.) | $M_w/M_n$ | Adhesion EVOH (lb./in.) |
|---|---|---|---|---|
| 21 | 0.918 | 13 | 8.2 | 1.8 |
| 22 | 0.922 | 1.8 | 3.4 | 3.8 |
| 23 | 0.925 | 0.3 | 3.3 | 4.3 |
| 24 | 0.920 | 0.25 | 6.6 | 4.0 |

Each composition contained 25 wt. % of the ethylene homopolymer, 10 wt. % of maleic anhydride grafted propylene homopolymer, and 65 wt. % NPP 8752 (a 2 melt flow rate impact copolymer containing 15 wt. % ethylene made by sequential polymerization of propylene and ethylene).

Adhesion to ethylene vinyl alcohol was determined by preparing a two layer coextruded cast film (8 mil thick) which was cut into 1 inch wide strips, with T-peel strength then measured on a tensile tester.

The foregoing detailed description is given for clearness of understanding only and no unnecessary limitations should be understood therefrom, as modifications within the scope of the invention will be obvious to those skilled in the art.

We claim:

1. An adhesive blend comprising a mixture of
   (a) a substantially non-elastomeric copolymer of propylene and ethylene wherein said ethylene comprises at least about 5 wt. % of said copolymer;
   (b) about 0.1 to 30 wt. % of said blend of a non-elastomeric graft copolymer comprising a propylene polymer backbone and a grafting monomer comprising at least one polymerizable ethylenically unsaturated carboxylic acid or acid derivative grafted onto said backbone; and
   (c) an adhesion-promoting effective amount of an ethylene homopolymer having a specific gravity in the range of about 0.915–0.930, inclusive, and a melt index of less than about 4 dg/min. as measured at 190° C.

2. The blend of claim 1 wherein said blend is substantially free of elastomeric material.

3. The blend of claim 1 wherein said ethylene homopolymer of (c) comprises between about 2 and 30 wt. % of said blend.

4. The blend of claim 3 wherein said ethylene homopolymer of (c) comprises at least about 5 wt. % of said blend.

5. The blend of claim 4 wherein said ethylene homopolymer of (c) comprises at least about 10 wt. % of said blend.

6. The blend of claim 1 wherein said copolymer of (b) comprises about 5 to 25 wt. % of said blend, said homopolymer of (c) comprises about 10 to 30 wt. % of said blend, and said copolymer of (a) comprises the balance of said blend.

7. The blend of claim 6 wherein said copolymer of (b) comprises about 5 to 15 wt. % of said blend and said homopolymer of (c) comprises about 20 to 25 wt. % of said blend.

8. The blend of claim 1 wherein said copolymer of (b) comprises at least 10 wt. % of said blend.

9. The blend of claim 1 wherein said copolymer of (a) is selected from the group consisting of random, block and impact copolymers.

10. The blend of claim 1 wherein said copolymer of (a) is a terpolymer of propylene, ethylene and another 1-olefin.

11. The blend of claim 1 wherein said comonomer of (b) is selected from the group consisting of acrylic acid, methacrylic acid, maleic acid, fumaric acid, itaconic acid, citraconic acid, mesaconic acid, maleic anhydride, 4-methyl cyclohex-4-ene-1,2-dicarboxylic acid anhydride, bicyclo(2.2.2.)oct-5-ene2,3-dicarboxylic acid anhydride, 1,2,3,4,5,8,9,10octahydronaphthalene-2,3-dicarboxylic acid anhydride, 2-oxa-1,3-diketospiro(4.4)-non-7-ene, bicyclo(2.2.1)hept-5- ene-2,3-dicarboxylic acid anhydride, maleopimaric acid, tetrahydrophthhalic anhydride, norborn-5-ene-2,3-dicarboxylic acid anhydride, Nadic anhydride, methyl Nadic anhydride, Himic anhydride, methyl Himic anhydride, and x-methylbicyclo(2.2.1)hept-5-ene-2,3-dicarboxylic acid anhydride.

12. The blend of claim 1 wherein said propylene polymer of (b) is a crystalline propylene homopolymer.

13. The blend of claim 1 wherein said grafting monomer comprises between about 0.1 and 3.0 wt. % of said copolymer of (b).

14. The blend of claim 13 wherein said grafting monomer is maleic anhydride and said backbone is a crystalline propylene homopolymer.

15. The blend of claim 1 wherein said melt index is about 2 dg/min. or less.

16. The blend of claim 1 wherein said ethylene homopolymer has a narrow molecular weight distribution as measured by a ratio of weight average molecular weight ($M_w$) to number average molecular weight ($M_n$) of about 3 to 5, inclusive.

17. A composite structure, comprising:
   (A) a first substrate comprising a layer of gas barrier material adhered to
   (B) a second substrate comprising a layer of a propylene polymer by
   (C) an adhesive blend disposed between said first and second substrates, said adhesive blend comprising a mixture of:
   (a) a substantially non-elastomeric copolymer of propylene and ethylene wherein said ethylene comprises at least about 5 wt. % of said copolymer;
   (b) about 0.1 to 30 wt. % of said blend of a non-elastomeric graft copolymer comprising a propylene polymer backbone and a grafting monomer comprising at least one polymerizable ethylenically unsaturated carboxylic acid or acid derivative grafted onto said backbone; and
   (c) an adhesion-promoting effective amount of an ethylene homopolymer having a specific gravity in the range of about 0.915–0.930, inclusive, and a melt index of less than about 4 dg/min. as measured at 190° C.

18. The composite structure of claim 17 wherein said gas barrier material is a polar material.

19. The composite structure of claim 17 wherein said gas barrier is selected from the group consisting of metals, nylon and ethylene vinyl alcohol copolymers.

20. The composite structure of claim 17 wherein said second substrate comprises a random, block or impact copolymer of propylene.

21. The composite structure of claim 17 wherein said second substrate is a propylene homopolymer.

22. The composite structure of claim 20 wherein said second substrate is a propylene copolymer.

23. The composite structure of claim 17 wherein said blend is substantially free of elastomeric material.

24. The composite structure of claim 17 wherein said ethylene homopolymer of (c) comprises between about 2 and 30 wt. % of said blend.

25. The composite structure of claim 24 wherein said ethylene homopolymer of (c) comprises at least about 5 wt. % of said blend.

26. The composite structure of claim 25 wherein said ethylene homopolymer of (c) comprises at least about 10 wt. % of said blend.

27. The composite structure of claim 17 wherein said copolymer of (b) comprises about 5 to 25 wt. % of said blend, said homopolymer of (c) comprises about 10 to 30 wt. % of said blend, and said copolymer of (a) comprises the balance of said blend.

28. The composite structure of claim 27 wherein said copolymer of (b) comprises about 5 to 15 wt. % of said blend and said homopolymer of (c) comprises about 20 to 25 wt. % of said blend.

29. The composite structure of claim 17 wherein said copolymer of (b) comprises at least 10 wt. % of said blend.

30. The composite structure of claim 17 wherein said copolymer of (a) is selected from the group consisting of random, block and impact copolymers.

31. The composite structure of claim 17 wherein said copolymer of (a) is a terpolymer of propylene, ethylene and another 1-olefin.

32. The composite structure of claim 17 wherein said comonomer of (b) is selected from the group consisting of acrylic acid, methacrylic acid, maleic acid, fumaric acid, itaconic acid, citraconic acid, mesaconic acid, maleic anhydride, 4-methyl cyclohex-4-ene-1,2-dicarboxylic acid anhydride, bicyclo(2.2.2)oct-5-ene-2,3-dicarboxylic acid anhydride, 1,2,3,4,5,8,9,10-octahydronaphthalene-2,3-dicarboxylic acid anhydride, 2-oxa-1,3-diketospiro)4.4)non-7-ene, bicyclo(2.2.1)hept-5-ene-2,3-dicarboxylic acid anhydride, maleopimaric acid, tetrahydrophthhalic anhydride, norborn-5-ene-2,3-dicarboxylic acid anhydride, Nadic anhydride, methyl Nadic anhydride, Himic anhydride, methyl Himic anhydride, and x-methylbicyclo(2.2.1)hept-5-ene-2,3-dicarboxylic acid anhydride.

33. The composite structure of claim 17 wherein said propylene polymer of (b) is a crystalline propylene homopolymer.

34. The composite structure of claim 17 wherein said grafting monomer comprises between about 0.1 and 3.0 wt. % of said copolymer of (b).

35. The composite structure of claim 34 wherein said grafting monomer is maleic anhydride and said backbone is a crystalline propylene homopolymer.

36. The composite structure of claim 17 wherein said melt index is about 2 dg/min. or less.

37. The composite structure of claim 17 wherein said ethylene homopolymer has a narrow molecular weight distribution as measured by a ratio of weight average molecular weight (Mw) to number average molecular weight (Mn) of about 3 to 5, inclusive.

38. A method of making a composite structure comprising the step of adhering:
(A) a first substrate comprising a layer of gas barrier material to
(B) a second substrate comprising a layer of a propylene polymer by
(C) an adhesive blend disposed between said first and second substrates, said adhesive blend comprising a mixture of:
(a) a substantially non-elastomeric copolymer of propylene and ethylene wherein said ethylene comprises at least about 5 wt. % of said copolymer;
(b) about 0.1 to 30 wt. % of said blend of a non-elastomeric graft copolymer comprising a propylene polymer backbone and a grafting monomer comprising at least one polymerizable ethylenically unsaturated carboxylic acid or acid derivative grafted onto said backbone; and
(c) an adhesion-promoting effective amount of an ethylene homopolymer having a specific gravity in the range of about 0.915–0.930, inclusive, and a melt index of less than about 4 dg/min. as measured at 190° C.

39. The method of claim 38 wherein said adhering step is carried out by coextrusion, blown film coextrusion, extrusion lamination or coextrusion blow molding.

40. The method of claim 38 wherein said gas barrier material is a polar material.

41. The method of claim 38 wherein said gas barrier material is selected from the group consisting of metals, nylon and ethylene vinyl alcohol copolymers.

42. The method of claim 38 wherein said second substrate comprises a random, block or impact copolymer of propylene.

43. The method of claim 38 wherein said second substrate is a propylene homopolymer.

44. The method of claim 38 wherein said second substrate is a propylene copolymer.

45. The method of claim 38 wherein said blend is substantially free of elastomeric material.

46. The method of claim 38 wherein said ethylene homopolymer of (c) comprises between about 2 and 30 wt. % of said blend.

47. The method of claim 46 wherein said ethylene homopolymer of (c) comprises at least about 5 wt. % of said blend.

48. The method of claim 47 wherein said ethylene homopolymer of (c) comprises at least about 10 wt. % of said blend.

49. The method of claim 38 wherein said copolymer of (b) comprises about 5 to 25 wt. % of said blend, said homopolymer of (c) comprises about 10 to 30 wt. % of said blend, and said copolymer of (a) comprises the balance of said blend.

50. The method of claim 49 wherein said copolymer of (b) comprises about 5 to 15 wt. % of said blend and said homopolymer of (c) comprises about 20 to 25 wt. % of said blend.

51. The method of claim 38 wherein said copolymer of (b) comprises at least 10 wt. % of said blend.

52. The method of claim 38 wherein said copolymer of (a) is selected from the group consisting of random, block and impact copolymers.

53. The method of claim 38 wherein said copolymer of (a) is a terpolymer of propylene, ethylene and another 1-olefin.

54. The method of claim 38 wherein said comonomer of (b) is selected from the group consisting of acrylic acid, methacrylic acid, maleic acid, fumaric acid, itaconic acid, citraconic acid, mesaconic acid, maleic anhydride, 4-methyl cyclohex-4-ene-1,2-dicarboxylic acid anhydride, bicyclo(2.2.2.)oct-5-ene-2,3-dicarboxylic acid anhydride, 1,2,3,4,5,8,9,10-octahydronaphthalene-2,3-dicarboxylic acid anhydride, 2-oxa-1,3-diketospiro(4.4)non-7-ene, bicyclo(2.2.1.)hept-5-ene-2,3-dicarboxylic acid anhydride, maleoprimaric acid, tetrahydrophthhalic anhydride, norborn-5-ene-2,3-dicarboxylic acid anhydride, Nadic anhydride, methyl Nadic anhydride, Himic anhydride, methyl Himic anhydride, and x-methylbicyclo( 2.2.1.)hept-5-ene-2,3-dicarboxylic acid anhydride.

55. The method of claim 38 wherein said propylene polymer of (b) is a crystalline propylene homopolymer.

56. The method of claim 38 wherein said grafting monomer comprises between about 0.1 and 3.0 wt. % of said copolymer of (b).

57. The method of claim 56 wherein said grafting monomer is maleic anhydride and said backbone is a crystalline propylene homopolymer.

58. The method of claim 38 wherein said melt index is about 2 dg/min. or less.

59. The method of claim 38 wherein said ethylene homopolymer has a narrow molecular weight distribution as measured by a ratio of weight average molecular weight ($M_w$) to number average molecular weight ($M_n$) of about 3 to 5, inclusive.

* * * * *